(12) United States Patent
Xie (10) Patent No.: US 10,012,865 B2
(45) Date of Patent: Jul. 3, 2018

(54) TRANSFLECTIVE LIQUID CRYSTAL DISPLAY DEVICE AND METHOD OF FORMING THE SAME

(71) Applicant: Shenzhen China Star Optoelectronics Technology Co., Ltd., Shenzhen, Guangdong (CN)

(72) Inventor: Chang Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 622 days.

(21) Appl. No.: 14/426,237

(22) PCT Filed: Dec. 29, 2014

(86) PCT No.: PCT/CN2014/095386
§ 371 (c)(1),
(2) Date: Mar. 5, 2015

(87) PCT Pub. No.: WO2016/095266
PCT Pub. Date: Jun. 23, 2016

(65) Prior Publication Data
US 2017/0322450 A1   Nov. 9, 2017

(30) Foreign Application Priority Data

Dec. 17, 2014  (CN) .......................... 2014 1 0790215

(51) Int. Cl.
*G02F 1/1335*  (2006.01)
*G09G 3/36*  (2006.01)
*G02F 1/136*  (2006.01)

(52) U.S. Cl.
CPC ........ *G02F 1/133555* (2013.01); *G02F 1/136* (2013.01); *G02F 1/1335* (2013.01);
(Continued)

(58) Field of Classification Search
None
See application file for complete search history.

(56) References Cited

U.S. PATENT DOCUMENTS

5,579,141 A * 11/1996 Suzuki .............. G02F 1/133788
349/124
2003/0202139 A1* 10/2003 Choi ..................... B82Y 20/00
349/113
(Continued)

*Primary Examiner* — James Dudek
(74) *Attorney, Agent, or Firm* — Andrew C. Cheng (57) ABSTRACT

A transflective LCD device and a method of forming the same are proposed. The transflective LCD includes a first substrate, a second substrate, a first alignment film, a second alignment film and a liquid crystal layer. The first substrate and the second substrate are divided into a transmissive area and a reflective area, in which areas of the first alignment film and the second alignment film are configured respectively by different aligning angles. The liquid crystal molecules in the liquid crystal layer corresponding to the transmissive area and the reflective area are tilted by different pretilt angles. Therefore, light going one-way through the liquid crystal layer corresponding to the transmissive area generates the same phase retardation as making a round-trip through the liquid crystal layer corresponding to the reflective area. The present invention can simplify technical difficulties, and reduce occurrences of poor rubbing and dark-state light leakage.

8 Claims, 3 Drawing Sheets

(52) U.S. Cl.
CPC ... *G09G 3/3648* (2013.01); *G09G 2300/0456* (2013.01); *G09G 2300/08* (2013.01)

(56) References Cited

U.S. PATENT DOCUMENTS

| | | | |
|---|---|---|---|
| 2006/0238675 A1* | 10/2006 | Zhu | G02F 1/133555 349/114 |
| 2008/0186436 A1* | 8/2008 | Chu | G02F 1/133753 349/114 |
| 2010/0085520 A1* | 4/2010 | Katayama | G02F 1/133753 349/114 |
| 2010/0110351 A1* | 5/2010 | Kim | G02F 1/133555 349/114 |
| 2010/0139856 A1* | 6/2010 | Lin | G02F 1/133753 156/273.3 |

\* cited by examiner

TRANSFLECTIVE LIQUID CRYSTAL DISPLAY DEVICE AND METHOD OF FORMING THE SAME

BACKGROUND OF THE INVENTION

1. Field of the Invention

The present invention relates to display technology, and more specifically, to a transflective liquid crystal display (LCD) device and its forming method.

2. Description of the Prior Art

In general, a LCD panel comprises a color film substrate and an array substrate combined together, encasing a liquid crystal layer in between. Given that liquid crystal molecules emit no light, a display panel needs a light source to show images. Based on the type of light sources adopted, LCD devices can be categorized as transimissive LCD, reflective LCD or transflective LCD.

A transmissive LCD panel mostly adopts a backlight source, which is installed on the back of the panel. Pixel electrodes on the array substrate are transparent, constituting a transmissive area, so that a beam from the backlight source can go through the liquid crystal layer and display images.

A reflective LCD panel mostly utilizes a front light or an external light as its light source. Pixel electrodes on the array substrate are reflective, constituting a reflective area capable of reflecting a beam from the front light source or external light source.

A transflective LCD panel can be taken as a mixture of the transmissive and reflective panels. Both a reflective area and a transmissive area are on the array substrate of the transflective LCD panel, so it is able to display images by using either the backlight source, or the front light source and external light source.

To build the transflective LCD panel, the conventional practice is to assemble two liquid crystal cells, one installed as the transmissive area and the other as the reflective area. In addition, an initial alignment of liquid crystal molecules is usually done by rubbing, which poses a technical challenge in the design of cells as a difference in thickness of the two cells will lead to poor rubbing and dark-state light leakage.

SUMMARY OF THE INVENTION

An object of the present invention is to provide a transflective LCD device and a method of forming the same as a simple solution to transflective display. The present invention can realize a single-cell transflective LCD, simplify technical difficulties, and reduce occurrences of poor rubbing and dark-state light leakage caused by a difference in thickness of two cells.

According to the present invention, a transflective liquid crystal display (LCD) device comprises: a first substrate; a second substrate, installed facing the first substrate; a first alignment film, installed on one side of the first substrate which is facing the second substrate; a second alignment film, installed on one side of the second substrate which is facing the first substrate; a liquid crystal layer, installed between the first alignment film and the second alignment film, comprising a plurality of liquid crystal molecules. The first substrate and the second substrate are divided into a transmissive area and a reflective area, in which areas of the first alignment film and the second alignment film are configured respectively by different aligning angles, so that the plurality of liquid crystal molecules in the liquid crystal layer corresponding to the transmissive area and the reflective area are tilted by different pretilt angles, so that a beam of light going one-way through the liquid crystal layer corresponding to the transmissive area has the same phase retardation as making a round-trip through the liquid crystal layer corresponding to the reflective area.

The transflective LCD device further comprises a first polarizer and a second polarizer that are installed respectively on the first substrate and the second substrate, with transmission axes of the first polarizer and the second polarizer installed in parallel, the liquid crystal molecules being positive liquid crystal molecules. The first alignment film and the second alignment film making the long axes of the liquid crystal molecules are in parallel with the first substrate and the second substrate.

The pretilt angle of the liquid crystal molecules in the liquid crystal layer corresponding to the transmissive area is larger than the pretilt angle of the liquid crystal molecules in the liquid crystal layer corresponding to the reflective area.

The pretilt angles are formed by an intersection of long axes of the plurality of liquid crystal molecules and the transmission axis.

The areas of the first alignment film in the transmissive area and the reflective area being coplanar, and the areas of the second alignment film in the transmissive area and the reflective area being the same.

The pretilt angle of the liquid crystal molecules in the liquid crystal layer corresponding to the transmissive area is in a range from 30 to 60 degrees, and the pretilt angle of the plurality of liquid crystal molecules in the liquid crystal layer corresponding to the reflective area is in a range from 10 to 45 degrees.

In one aspect of the present invention, the transflective LCD device further comprises: a pixel electrode and a common electrode installed on the first substrate. The pixel electrode and common electrode, when a voltage is applied, generate an electric field in parallel with the first substrate and the second substrate, so that the long axes of the plurality of liquid crystal molecules are rotated to be in parallel with the transmission axes.

In another aspect of the present invention, the transflective LCD device further comprises: a reflective layer, installed in the reflective area on the side of the first substrate which is farther away from the second substrate, with its outer surface and the outer surface of the first substrate in the transmissive area being coplanar.

According to the present invention, a transflective liquid crystal display (LCD) device comprises: a first substrate; a second substrate, installed facing the first substrate; a first alignment film, installed on one side of the first substrate which is facing the second substrate; a second alignment film, installed on one side of the second substrate which is facing the first substrate; a liquid crystal layer, installed between the first alignment film and the second alignment film, comprising a plurality of liquid crystal molecules.

The first substrate and the second substrate are divided into a transmissive area and a reflective area, in which areas of the first alignment film and the second alignment film are configured respectively by different aligning angles, so that the plurality of liquid crystal molecules in the liquid crystal layer corresponding to the transmissive area and the reflective area are tilted by different pretilt angles, so that a beam of light going one-way through the liquid crystal layer corresponding to the transmissive area has the same phase retardation as making a round-trip through the liquid crystal layer corresponding to the reflective area.

In one aspect of the present invention, the transflective LCD device further comprises a first polarizer and a second polarizer that are installed respectively on the first substrate and the second substrate, with transmission axes of the first polarizer and the second polarizer installed in parallel, the liquid crystal molecules being positive liquid crystal molecules, the first alignment film and the second alignment film makes the long axes of the liquid crystal molecules aligning in parallel with the first substrate and the second substrate, wherein the pretilt angle of the liquid crystal molecules in the liquid crystal layer corresponding to the transmissive area is larger than the pretilt angle of the liquid crystal molecules in the liquid crystal layer corresponding to the reflective area, and wherein the pretilt angles are formed by an intersection of long axes of the plurality of liquid crystal molecules and the transmission axis.

In another aspect of the present invention, the areas of the first alignment film in the transmissive area and the reflective area being coplanar, and the areas of the second alignment film in the transmissive area and the reflective area being the same.

In another aspect of the present invention, the pretilt angle of the liquid crystal molecules in the liquid crystal layer corresponding to the transmissive area is in a range from 30 to 60 degrees, and the pretilt angle of the plurality of liquid crystal molecules in the liquid crystal layer corresponding to the reflective area is in a range from 10 to 45 degrees.

In still another aspect of the present invention, the transflective LCD device further comprises: a pixel electrode and a common electrode installed on the first substrate. The pixel electrode and common electrode, when a voltage is applied, generate an electric field in parallel with the first substrate and the second substrate, so that the long axes of the plurality of liquid crystal molecules are rotated to be in parallel with the transmission axes.

In yet another aspect of the present invention, the transflective LCD device further comprises: a reflective layer, installed in the reflective area on the side of the first substrate which is farther away from the second substrate, with its outer surface and the outer surface of the first substrate in the transmissive area being coplanar.

According to the present invention, a method of forming a transflective liquid crystal display (LCD) device comprises: providing a liquid crystal display panel comprising a first substrate, a second substrate facing the first substrate, a first alignment film installed on one side of the first substrate which is facing the second substrate, and a second alignment film installed on one side of the second substrate which is facing the first substrate, with the first substrate and the second substrate divided into a transmissive area and a reflective area; photo-aligning the first alignment film and the second alignment film in the transmissive area by a first aligning angle, so that liquid crystal molecules of the liquid crystal layer corresponding to the transmissive area are tilted by the first pretilt angle; and photo-aligning the first alignment film and the second alignment film in the reflective area by a second aligning angle, so that the liquid crystal molecules in the liquid crystal layer corresponding to the reflective area are tilted by the second pretilt angle. The first aligning angle is different from the second aligning angle, so that a beam of light going one-way through the liquid crystal layer corresponding to the transmissive area has the same phase retardation as making a round-trip through the liquid crystal layer corresponding to the reflective area.

In one aspect of the present invention, the method further comprises: installing a first polarizer on the first substrate; installing a second polarizer on the second substrate. Transmission axes of the first polarizer and the second polarizer are installed in parallel, with the liquid crystal molecules being positive liquid crystal molecules, and the first alignment film and the second alignment film aligned horizontally, so that long axes of the liquid crystal molecules paralleling with the first substrate and the second substrate. The first pretilt angle is larger than the second pretilt angle. The first pretilt angle and the second pretilt angle are formed by intersection of the long axes of the liquid crystal molecules and the transmission axes.

In still another aspect of the present invention, the method further comprises: installing a pixel electrode and a common electrode on the first substrate. An electric field in parallel with the first substrate and the second substrate is generated when a voltage is applied across the pixel electrode and the common electrode, so that the long axes of the liquid crystal molecules are turned to be in parallel with the transmission axes.

In yet another aspect of the present invention, the method further comprises: installing a reflective layer in the reflective area on the side of the first substrate which is farther away from the second substrate, with an outer surface of the reflective layer and the outer surface of the first substrate in the transmissive area being coplanar.

In contrast to prior art, the present invention has an advantage of dividing a first substrate and a second substrate into the transmissive area and the reflective area. The transmissive and reflective areas on a first alignment film and second alignment film are aligned by different angles, thus the liquid crystal molecules in the liquid crystal layer of the corresponding transmissive and reflective areas are tilted by different pretilt angles. Therefore, a beam of light going one-way through the liquid crystal layer corresponding to the transmissive area generates the same phase retardation as making a round-trip through the liquid crystal layer corresponding to the reflective area. The present invention can thus realize the single-cell transflective LCD, simplify technical difficulties, and reduce occurrences of poor rubbing and dark-state light leakage caused by the difference in thickness of two cells.

DETAILED DESCRIPTION OF PREFERRED EMBODIMENTS

Figure 1:
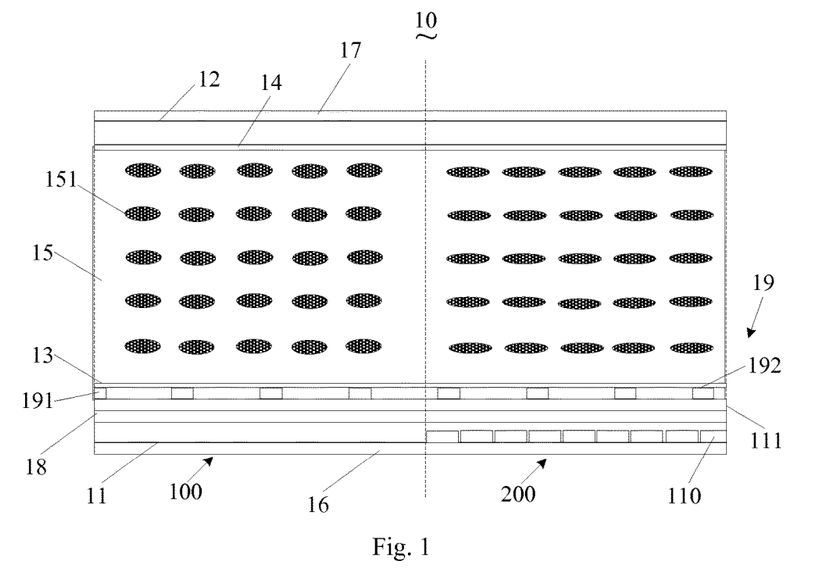
FIG. 1 is a longitudinal section diagram of a transflective LCD device according to an embodiment of the present invention.
Figure 2:
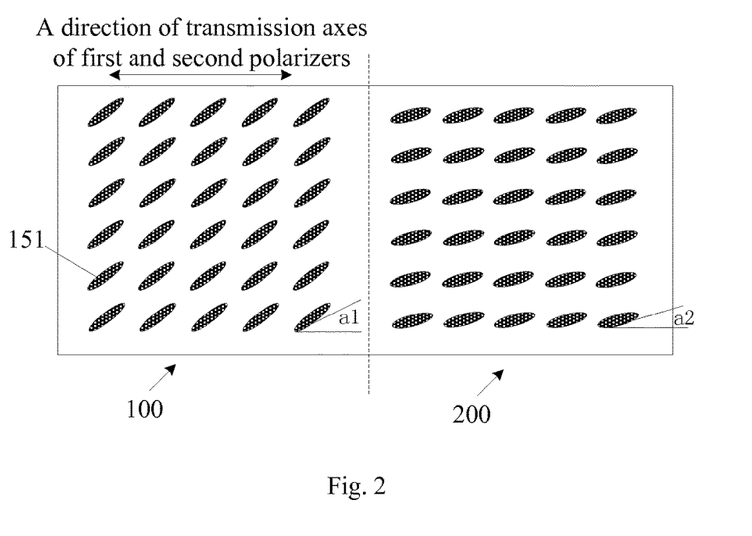
FIG. 2 is a top view of the liquid crystal molecules when no voltage is applied on the transflective LCD device of the present invention.

Please refer to FIG. 1 and FIG. 2. FIG. 1 is a longitudinal section diagram of a transflective LCD device according to an embodiment of the present invention. FIG. 2 is a top view of the liquid crystal molecules when no voltage is applied on the transflective LCD device of the present invention. The transflective LCD device 10 of the present invention comprises a first substrate 11, a second substrate 12, a first alignment film 13, a second alignment film 14 and a liquid crystal layer 15.

The first substrate 11 and the second substrate 12, may be made of glass materials, are installed facing each other.

The first alignment film 13 is installed on one side of the first substrate 11 which is facing the second substrate 12. The second alignment film 14 is installed on one side of the second substrate 12 which is facing the first substrate 11.

The first alignment film 13 and the second alignment film 14, after being irradiated to trigger a photoreaction, generate anisotropic films that induce liquid crystal molecules to align orderly. A preferred irradiation light is an ultraviolet light with either linear polarization or non-linear polarization. The first alignment film 13 and the second alignment film 14 is made of photosensitive materials. Based on the type of anisotropic photoreactions triggered, photosensitive materials can be categorized into three groups: photoisomerization, with azobenzene group being a most representative material; photodimerization, with cinnamate and chalcone group being two most representative materials; and photodegradation, with cyclobutane dianhydride polyimide being a most representative material.

The liquid crystal layer 15, between the first substrate 11 and the second substrate 12, comprises a plurality of liquid crystal molecules 151. More specifically, the liquid crystal layer 15 is positioned between the first alignment film 13 and the second alignment film 14.

In the present embodiment, the first substrate 11 and the second substrate 12 is divided into a transmissive area 100 and a reflective area 200. The first alignment film 13 and the second alignment 14 are aligned by different angles respectively for the transmissive area 100 and the reflective area 200, so that the liquid crystal molecules 151 in the liquid crystal layer 15 corresponding to the transmissive area 100 and the reflective area 200 are tilted by different pretilt angles (as a1 and a2 shown in FIG. 2). Therefore, a beam of light going one-way through the liquid crystal layer 15 corresponding to the transmissive area 100 has the same phase retardation as making a round-trip through the liquid crystal layer 15 corresponding to the reflective area 200.

Areas of the first alignment film 13 in the transmissive area 100 and the reflective area 200 are coplanar, and so are the areas of the second alignment film 14. Therefore, the present invention is able to realize the single-cell transflective LCD device 10.

The present embodiment makes it possible to utilize simple methods, such as photoalignment, to realize semi-transmissive/semi-reflective display, lowering manufacturing difficulties. It can thus produce the single-cell transflective LCD device 10, simplify technical difficulties, and reduce occurrences of poor rubbing and dark-state light leakage caused by the difference in thickness of two cells.

The following is a specific process of aligning the first alignment film 13 and the second alignment 14 by different angles respectively for the transmissive area 100 and the reflective area 200. First, shield areas of the first alignment film 13 and the second alignment film 14 corresponding to the reflective area 200. And then, photo-align the first alignment film 13 and second alignment film 14 by an aligning angle a1 in the transmissive area 100, so that the liquid crystal molecules 151 in the liquid crystal layer 15 corresponding to the transmissive 100 are tilted by the pretilt angle a1. Apply the same method on the reflective area 200. First, shield areas of the first alignment film 13 and second alignment film 14 corresponding to the transmissive area 100. And then, photo-align the first alignment film 13 and the second alignment film 14 by an aligning angle a2 in the reflective area 200, so that the liquid crystal molecules 151 in the liquid crystal layer 15 corresponding to the reflective area 200 are tilted by the pretilt angle a2.

Note that the aligning angles a1 and a2 have the same incident direction to ensure that liquid crystal molecules 151, albeit corresponding respectively to transmissive area 100 and reflective area 200, are turned in the same direction and form the pretilt angles a1 and a2.

The range of the pretilt angle a1 of the liquid crystal molecules 151 in the liquid crystal layer 15 corresponding to the transmissive area 100 is 30 to 60 degrees, while the range of the pretilt angle a2 of the liquid crystal molecules 151 in the liquid crystal layer 15 corresponding to the reflective area 200 is 10 to 45 degrees.

The transflective LCD device 10 further comprises a first polarizer 16 installed on the first substrate 11, and a second polarizer 17 installed on the second substrate 12. More specifically, the first polarizer 16 is installed on one side of the first substrate 11 which is farther away from the second substrate 12, and the second polarizer 17 is installed on one side of the second substrate 12 which is farther away from the first substrate 11. The transmission axes of the first polarizer 16 and the second polarizer 17 are installed in parallel. Please refer to FIG. 2 for the specific direction. The liquid crystal molecules 151 are positive molecules. The first alignment film 13 and the second alignment film 14 are aligned horizontally, so that long axes of liquid crystal molecules 151 are in parallel with the first substrate 11 and the second substrate 12. The pretilt angle a1 of liquid crystal molecules 151 in the liquid crystal layer 15 corresponding to the transmissive area 100 is larger than the pretilt angle a2 of liquid crystal molecules 151 in the liquid crystal layer 15 corresponding to the reflective area 200. The pretilt angles a1 and a2 are the angles formed by the intersecting long axes of liquid crystal molecules 151 and the transmission axes.

Figure 3:
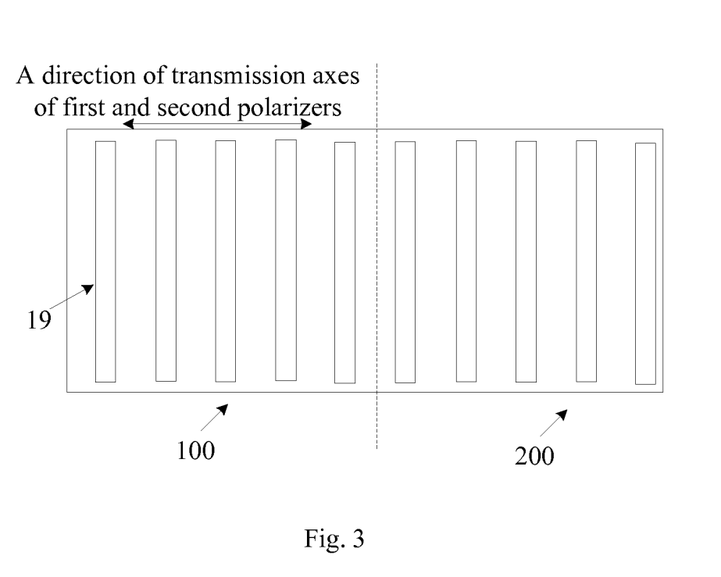
FIG. 3 shows a structure of a pixel electrode.

The transflective LCD device 10 further comprises a pixel electrode 19 and a common electrode 18. An electric field having a direction in parallel with the first substrate 11 and the second substrate 12 is generated when a voltage is applied across the pixel electrode 19 and the common electrode 18, thereby rotating the long axes of the liquid crystal molecules 151 to be in parallel with the transmission axis. The pixel electrode 19, shown in FIG. 3, comprises a pixel electrode 191 in the transmissive area and a pixel electrode 192 in the reflective area. The pixel electrode 191 in the transmissive area 100 is a transparent conductive film, preferably an indium tin oxide (ITO) film. The pixel electrode 192 in the reflective area 200 is a reflective conductive film, such as metal. The pixel electrode 191 and the pixel electrode 192 are coplanar, so the transflective LCD device 10 of the present invention can have a single-cell structure.

Between the pixel electrode 19 and the common electrode 18 there is an insulation layer 111 to insulate the pixel electrode 19 and the common electrode 18.

The transflective LCD device 10 also comprises a reflective layer 110, disposed in the reflective area 200, on the side of the first substrate 11 which is farther away from the second substrate 12. The outer surface of the reflective layer 110 and the outer surface of the first substrate 11 in the transmissive area 100 are coplanar. The reflective layer 110 can be made from the same material as the pixel electrode 192. The reflective layer 110 of the present invention can further reflect the light emitted by the pixel electrode 192, thus raises the reflectivity.

The principle of the transflective LCD device 10 of the present embodiment is introduced as follows.

The first alignment film 13 and the second alignment film 14 are aligned horizontally, while the transmission axes of the first polarizer 16 and the second polarizer 17 are positioned horizontally as well.

The pretilt angle a1 of the liquid crystal molecules 151 in the transmissive area 100 is larger than the pretilt angle a2 of the liquid crystal molecules 151 in the reflective area 200. The present invention optimizes the pretilt angles a1 and a2 of the liquid crystal molecules 151, so an optical path generated by a light when it is going one-way through the transmissive area 100 is larger than that generated when it is going one-way through the reflective area 200. The relationship of the two optical paths can be written as $\Delta n1 = 2 * \Delta n2$, with $\Delta n1$ being the optical path of the light going through the transmissive area 100 and $\Delta n2$ being the optical path of the light going through reflective area 200. In addition, the light in the reflective area 200, because of the reflection, has to go through the liquid crystal layer 15 twice. It means that the relationship of the paths the light must go through the liquid crystal layer 15 in the transmissive area 100 and the reflective area 200 can be written as $d1 = 2*d2$, with d1 being the path the light must travel in the reflective area 200, and d2 the path the light must travel in the transmissive area 100. To sum up, as $(\Delta n1 * d2) = (\Delta n2 * d1)$, the same light retardation is attained to with the transmissive area 100 and the reflective area 200, meaning that the phase retardation in the transmissive area 100 and reflective area 200 are equivalent, and eventually a transflective display effect is realized.

Figure 4:
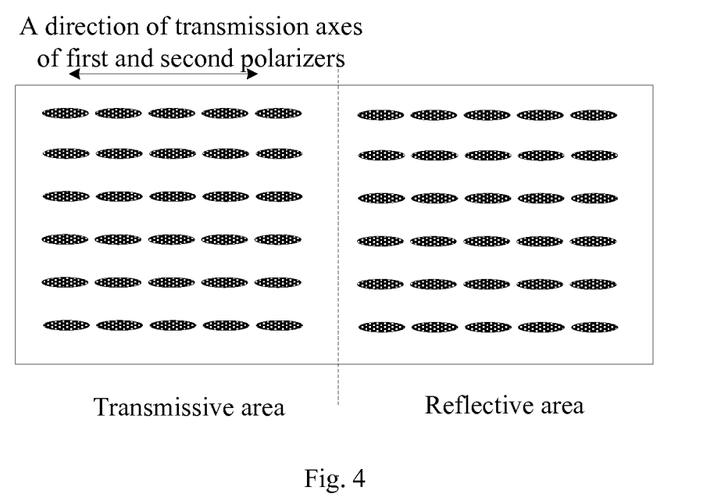
FIG. 4 is a top view of the liquid crystal molecules when a voltage is applied on the transflective LCD device of the present invention.

When a voltage is applied, the positive liquid crystal molecules 151 in the transmissive area 100 and reflective area 200 deflect horizontally, as shown in the FIG. 4. It is because the liquid crystal molecules are influenced by the horizontal electric field which is generated by the pixel electrode 19 and the common electrode 18 and in parallel with the first substrate 11 and the second substrate 12. The liquid crystal molecules 151 in the transmissive area 100 and the reflective area 200 are aligned in the direction parallel to the first alignment film 13 and the second alignment film 14.

Now, if a vertical incident light goes through the horizontally aligned liquid crystal layer 15, the phase retardation generated from the transmissive area 100 and the reflective area 200 will be the same. Due to the fact that the outgoing light does not change its direction of polarization, and the transmission axes of the first polarizer 16 and the second polarizer 17 of the present invention are lined horizontally, the light will go out through the transmission axis of the second polarizer 17 and realize a bright-state display.

Therefore, the present embodiment makes it possible to utilize simple methods, such as photoalignment, to realize transflective display, lowering manufacturing difficulties. It can thus produce the single-cell transflective LCD device 10, simplify technical difficulties, and reduce occurrences of poor rubbing and dark-state light leakage caused by the difference in thickness of two cells.

Based on the aforementioned transflective LCD device 10, the present invention further provides a forming method of the transflective LCD device 10. Please refer to FIG. 5 for specific details.

Figure 5:
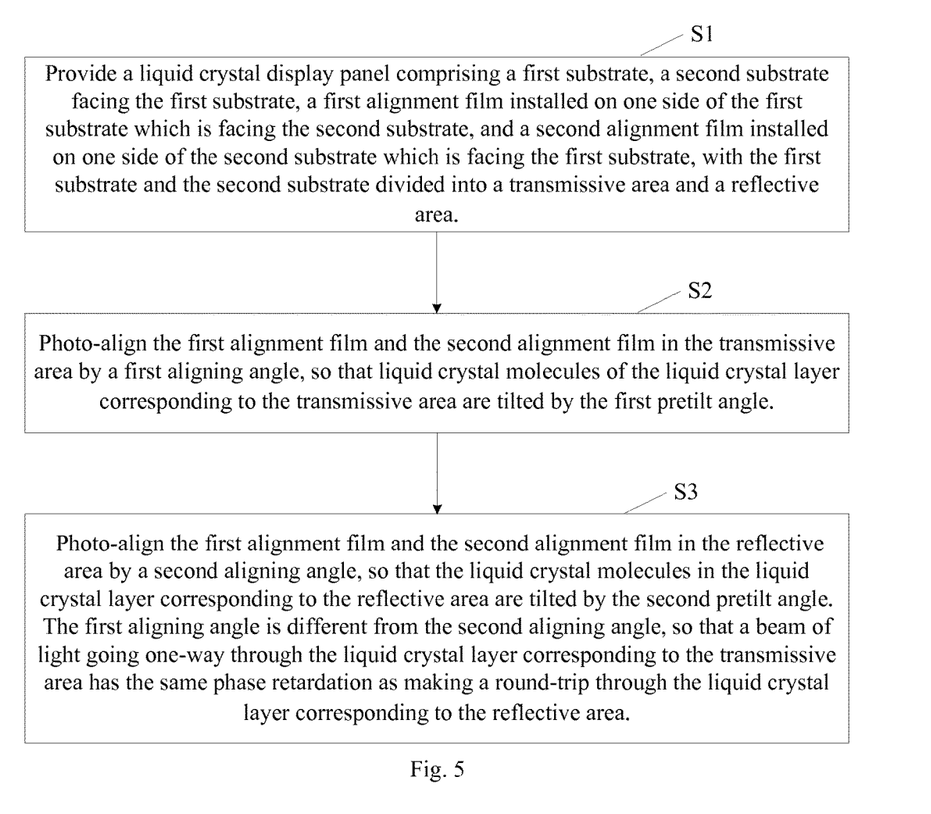
FIG. 5 illustrates a flowchart of a method of forming a transflective LCD device according to another embodiment of the present invention.

As shown in FIG. 5, a method of forming the transflective LCD device 10 of the present invention comprises the following steps:

Step S1: Provide a liquid crystal panel comprising a first substrate, a second substrate installed facing the first substrate, a first alignment film installed on one side of the first substrate which is facing the second substrate, and a second alignment film installed on one side of the second substrate which is facing the first substrate. The first substrate and the second substrate are divided into a transmissive area and a reflective area.

The areas of the first alignment film in the transmissive area and reflective area are coplanar, and so are the areas of the second alignment film. The present invention can thus realize the single-cell transflective LCD device.

In this step, a liquid crystal layer, comprising a plurality of liquid crystal molecules, is encased between the first alignment film and the second alignment film.

Step S2: Photo-align the first and the second alignment films in the transmissive area by the first aligning angle, so that the liquid crystal molecules in the liquid crystal layer corresponding to the transmissive area are tilted by the first pretilt angle.

A more detailed explanation of the step S2: Shield areas of the first alignment film 13 and the second alignment film 14 in the reflective area, and then photo-align the first alignment film 13 and the second alignment film 14 in the transmissive area by the aligning angle a1, so that liquid crystal molecules 151 in the liquid crystal layer 15 corresponding to the transmissive area are tiled by the pretilt angle a1.

Step S3: Photo-align the first and second alignment films in the reflective area by the second aligning angle, so that the liquid crystal molecules in the liquid crystal layer corresponding to the reflective area are tilted by the second pretilt angle. The first pretilt angle is different from the second one, so that the light going one-way through the liquid crystal layer corresponding to the transmissive area has the same phase retardation as making a round-trip through the liquid crystal layer corresponding to the reflective area.

A more detailed explanation of the step S3: Shield areas of the first alignment film 13 and second alignment film 14 in the transmissive area, and then photo-align the first alignment film 13 and the second alignment film 14 in the reflective area by the aligning angle a2, so that liquid crystal molecules 151 in the liquid crystal layer 15 corresponding to the reflective area are tilted by the pretilt angle a2.

The aligning angles a1 and a2 have the same incident direction, so to ensure that liquid crystal molecules in the transmissive area and reflective area would turn in the same direction and form the pretilt angles a1 and a2.

The range of the pretilt angle a1 of the liquid crystal molecules in the liquid crystal layer corresponding to the transmissive area is 30 to 60 degrees, while the range of the pretilt angle a2 of the liquid crystal molecules in the liquid crystal layer corresponding to the reflective area is 10 to 45 degrees.

The present method further installs the first polarizer on the first substrate, and the second polarizer on the second substrate. More specifically, the first polarizer is installed on the side of the first substrate which is farther away from the second substrate, and the second polarizer is installed on the side of the second substrate which is farther away from the first substrate.

The transmission axes of the first polarizer and the second polarizer are installed in parallel. The liquid crystal molecules are positive. The first alignment film and the second alignment film are aligned horizontally, so that the long axes of the liquid crystal molecules are in parallel with the first and second substrates. The pretilt angle a1 of the liquid crystal molecules in the liquid crystal layer corresponding to the transmissive area is larger than the pretilt angle a2 of the liquid crystal molecules in the liquid crystal layer corresponding to the reflective area. The pretilt angles a1 and a2 are the angles formed by the intersecting long axes of the liquid crystal molecules and the transmission axes.

In addition, a pixel electrode and a common electrode are installed on the first substrate, and an insulation layer is inserted between the two electrodes. When a voltage is applied, the pixel electrode and common electrode generate an electric field that parallels the first substrate and the second substrate, and turns the long axes of the liquid crystal molecules to be in parallel with the transmission axes.

The pixel electrode comprises pixel electrodes in the transmissive area and reflective area. The pixel electrode in the transmissive area 100 is a transparent conductive film, preferably an indium tin oxide (ITO) film. The pixel electrode in the reflective area 200 is a reflective conductive film, such as metal. The pixel electrode in the transmissive area and the pixel electrode in the reflective area are coplanar, so the present invention can form the structure of a single-cell transflective LCD device.

Furthermore, a reflective layer is disposed in the reflective area on the side of the first substrate which is farther away from the second substrate. The outer surface of the reflective layer and the outer surface of the first substrate in the transmissive area are coplanar.

To sum up, the present invention can realize the single-cell transflective LCD device 10 with a simple method, lower the manufacturing difficulties, and reduce occurrences of poor rubbing and dark-state light leakage caused by the difference in thickness of two cells.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transflective liquid crystal display (LCD) device, comprising:
    a first substrate;
    a second substrate, installed facing the first substrate;
    a first alignment film, installed on one side of the first substrate which is facing the second substrate;
    a second alignment film, installed on one side of the second substrate which is facing the first substrate;
    a liquid crystal layer, installed between the first alignment film and the second alignment film, comprising a plurality of liquid crystal molecules;
    wherein the first substrate and the second substrate are divided into a transmissive area and a reflective area, in which areas of the first alignment film and the second alignment film are configured respectively by different aligning angles, so that the plurality of liquid crystal molecules in the liquid crystal layer corresponding to the transmissive area and the reflective area are tilted by different pretilt angles, so that a beam of light going one-way through the liquid crystal layer corresponding to the transmissive area has the same phase retardation as making a round-trip through the liquid crystal layer corresponding to the reflective area;
    wherein the transflective LCD device further comprises a first polarizer and a second polarizer that are installed respectively on the first substrate and the second substrate, with transmission axes of the first polarizer and the second polarizer installed in parallel, the liquid crystal molecules being positive liquid crystal molecules, the first alignment film and the second alignment film making the long axes of the liquid crystal molecules aligning in parallel with the first substrate and the second substrate;
    wherein the pretilt angle of the liquid crystal molecules in the liquid crystal layer corresponding to the transmissive area is larger than the pretilt angle of the liquid crystal molecules in the liquid crystal layer corresponding to the reflective area;
    wherein the pretilt angles are formed by an intersection of long axes of the plurality of liquid crystal molecules and the transmission axis;
    the areas of the first alignment film in the transmissive area and the reflective area being coplanar, and the areas of the second alignment film in the transmissive area and the reflective area being the same;
    the pretilt angle of the liquid crystal molecules in the liquid crystal layer corresponding to the transmissive area ranging from 30 to 60 degrees, and the pretilt angle of the plurality of liquid crystal molecules in the liquid crystal layer corresponding to the reflective area ranging from 10 to 45 degrees.

2. The transflective LCD device of claim 1, further comprising:
    a pixel electrode and a common electrode installed on the first substrate;
    wherein the pixel electrode and common electrode, when a voltage is applied, generate an electric field in parallel with the first substrate and the second substrate, so that the long axes of the plurality of liquid crystal molecules are rotated to be in parallel with the transmission axes.

3. The transflective LCD device of claim 2, further comprising:
    a reflective layer, installed in the reflective area on the side of the first substrate which is farther away from the second substrate, with its outer surface and the outer surface of the first substrate in the transmissive area being coplanar.

4. A transflective liquid crystal display (LCD) device, comprising:
    a first substrate;
    a second substrate, installed facing the first substrate;
    a first alignment film, installed on one side of the first substrate which is facing the second substrate;
    a second alignment film, installed on one side of the second substrate which is facing the first substrate;
    a liquid crystal layer, installed between the first alignment film and the second alignment film, comprising a plurality of liquid crystal molecules;
    wherein the first substrate and the second substrate are divided into a transmissive area and a reflective area, in which areas of the first alignment film and the second alignment film are configured respectively by different aligning angles, so that the plurality of liquid crystal molecules in the liquid crystal layer corresponding to the transmissive area and the reflective area are tilted by different pretilt angles, so that a beam of light going one-way through the liquid crystal layer corresponding to the transmissive area has the same phase retardation as making a round-trip through the liquid crystal layer corresponding to the reflective area; and
    wherein the transflective LCD device further comprises a first polarizer and a second polarizer that are installed respectively on the first substrate and the second substrate, with transmission axes of the first polarizer and the second polarizer installed in parallel, the liquid crystal molecules being positive liquid crystal molecules, the first alignment film and the second alignment film making the long axes of the liquid crystal molecules aligning in parallel with the first substrate and the second substrate, wherein the pretilt angle of the liquid crystal molecules in the liquid crystal layer corresponding to the transmissive area is larger than the pretilt angle of the liquid crystal molecules in the liquid crystal layer corresponding to the reflective area, and wherein the pretilt angles are formed by an intersection of long axes of the plurality of liquid crystal molecules and the transmission axis.

5. The transflective LCD device of claim 4, wherein the areas of the first alignment film in the transmissive area and the reflective area being coplanar, and the areas of the second alignment film in the transmissive area and the reflective area being the same.

6. The transflective LCD device of claim 4, wherein the pretilt angle of the liquid crystal molecules in the liquid crystal layer corresponding to the transmissive area is in a range from 30 to 60 degrees, and the pretilt angle of the plurality of liquid crystal molecules in the liquid crystal layer corresponding to the reflective area is in a range from 10 to 45 degrees.

7. The transflective LCD device of claim 4, further comprising:
   a pixel electrode and a common electrode installed on the first substrate;
   wherein the pixel electrode and common electrode, when a voltage is applied, generate an electric field in parallel with the first substrate and the second substrate, so that the long axes of the plurality of liquid crystal molecules are rotated to be in parallel with the transmission axes.

8. The transflective LCD device of claim 7, further comprising:
   a reflective layer, installed in the reflective area on the side of the first substrate which is farther away from the second substrate, with its outer surface and the outer surface of the first substrate in the transmissive area being coplanar.

* * * * *